Sept. 26, 1944. W. C. MORRIS 2,358,872
GATHERING MACHINE
Filed Feb. 3, 1943 3 Sheets-Sheet 1
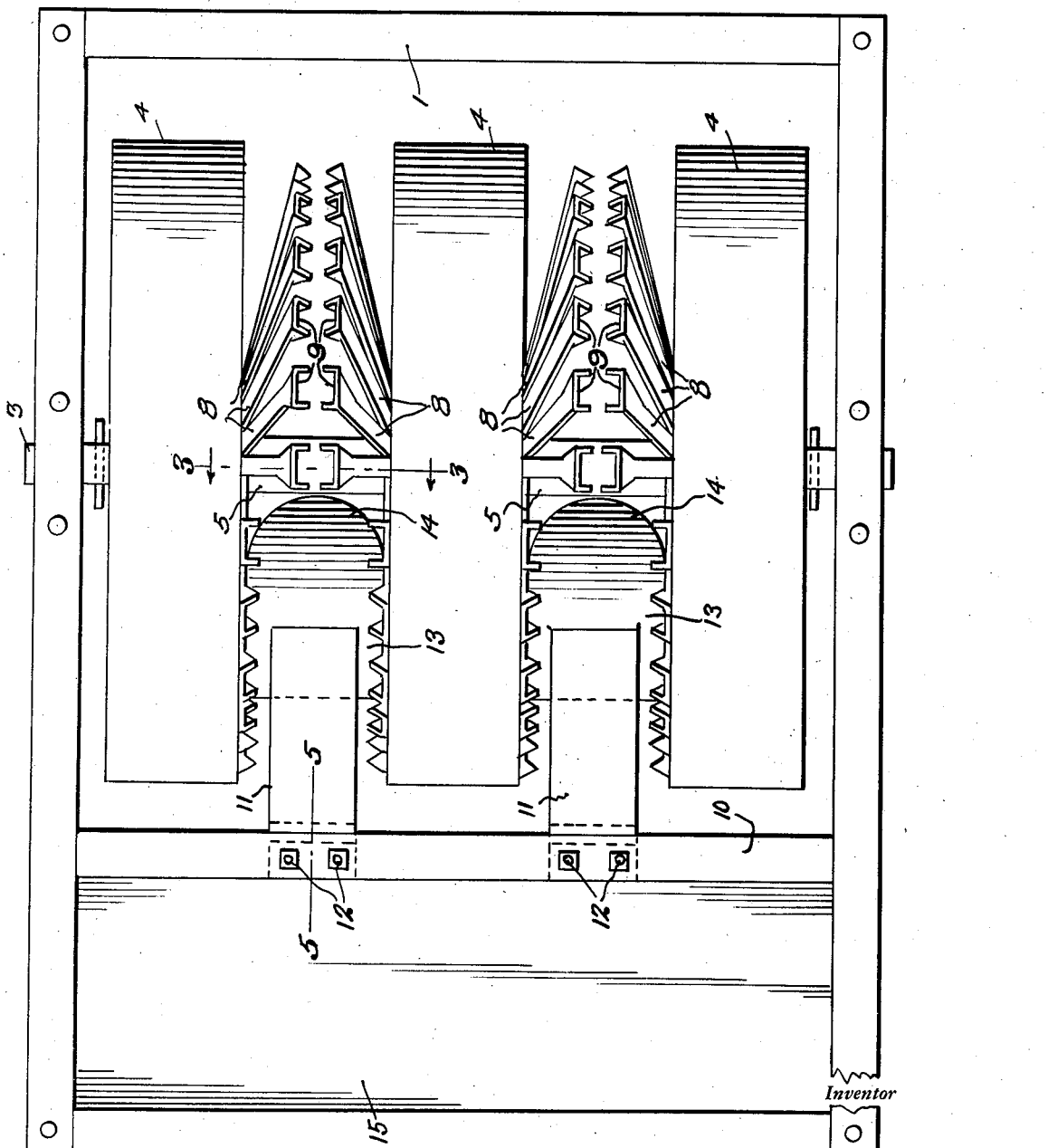
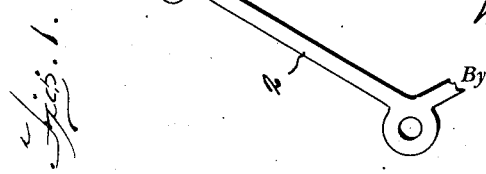

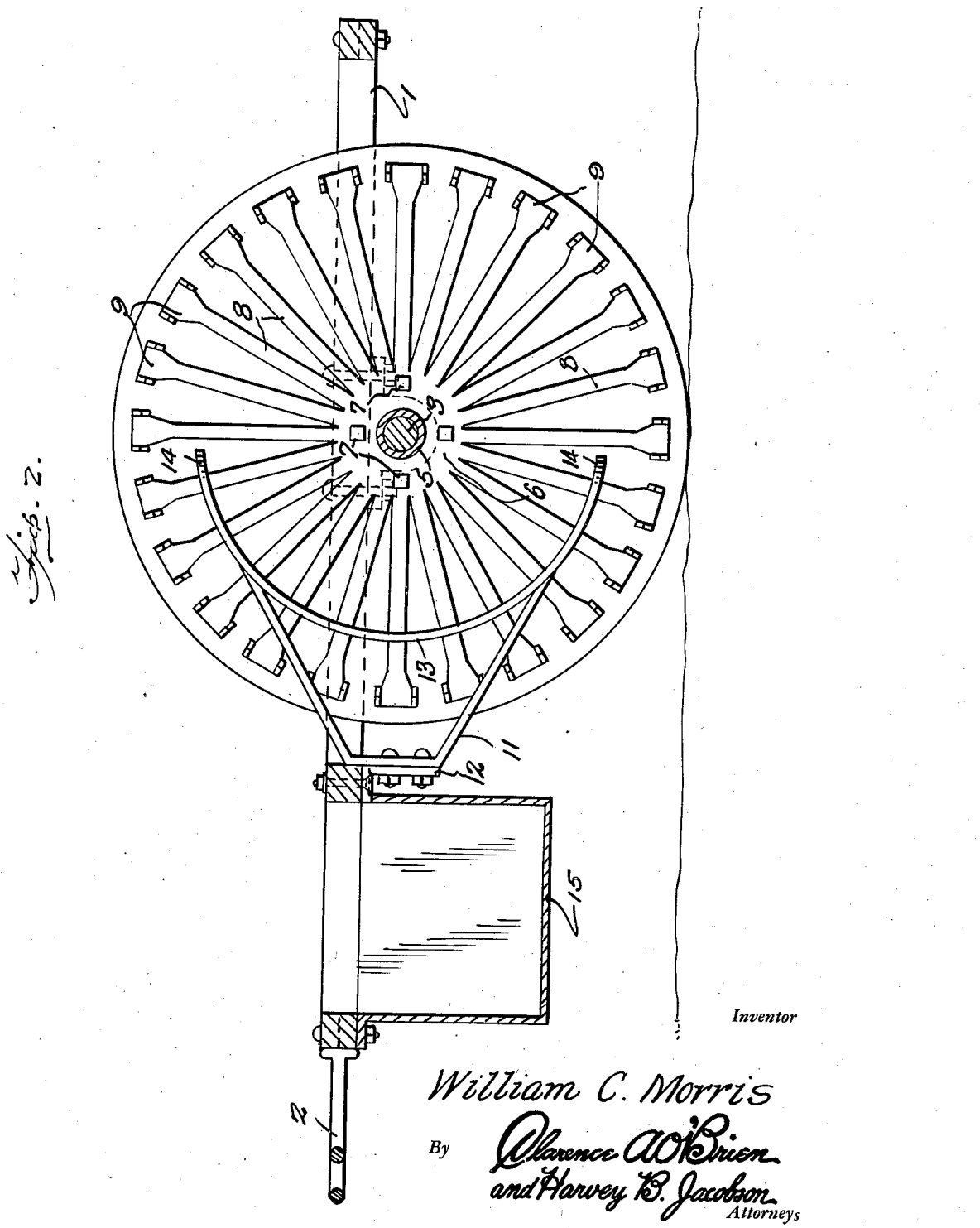

Sept. 26, 1944.  W. C. MORRIS  2,358,872
GATHERING MACHINE
Filed Feb. 3, 1943  3 Sheets-Sheet 3
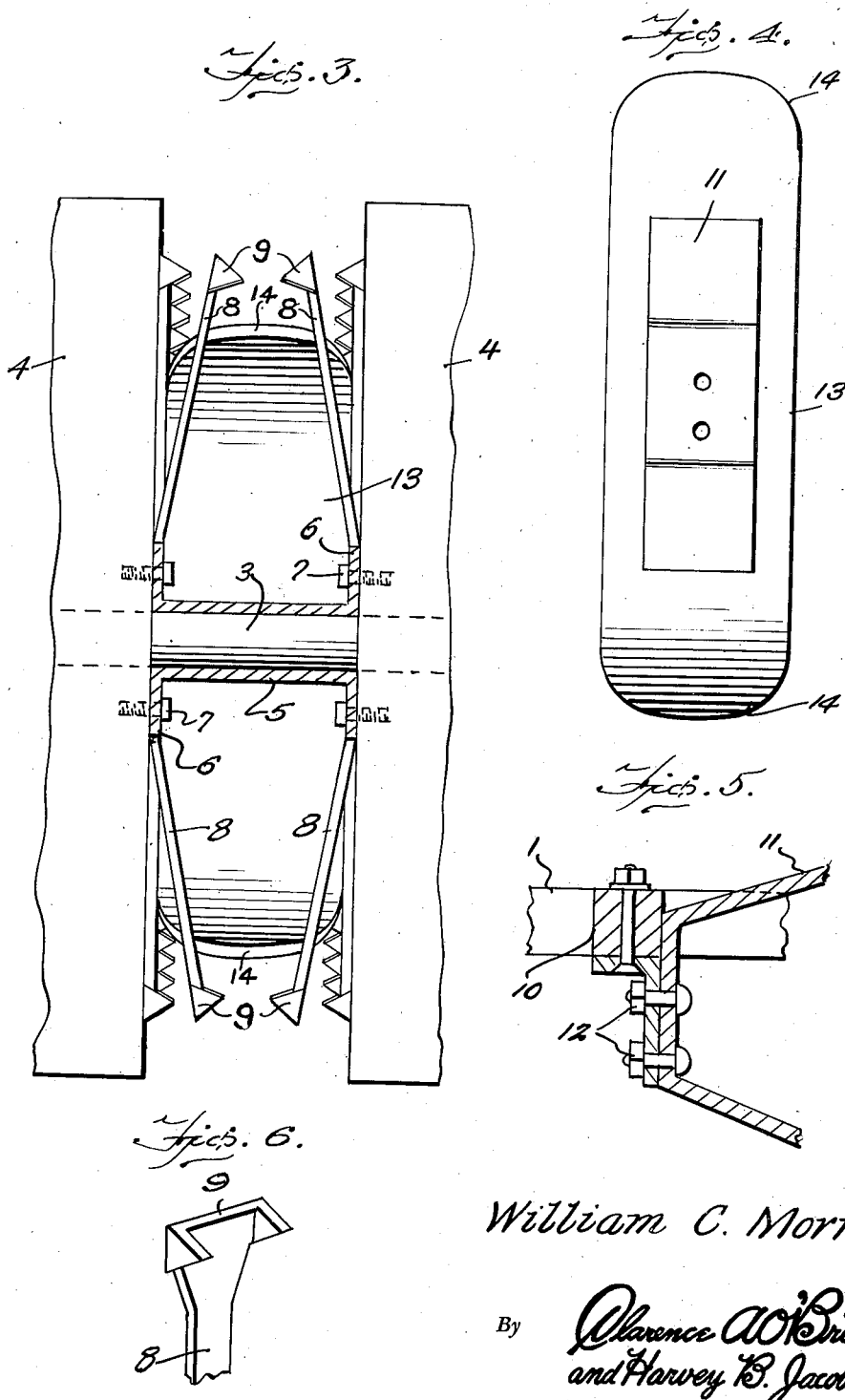

Patented Sept. 26, 1944

2,358,872

UNITED STATES PATENT OFFICE 2,358,872

GATHERING MACHINE

William C. Morris, Woodland, Calif.

Application February 3, 1943, Serial No. 474,603

3 Claims. (Cl. 55—108)

The present invention relates to new and useful improvements in gathering machines, and has for its primary object to provide, in a manner as hereinafter set forth, an implement of this character comprising novel means for gripping, elevating and depositing in a container sugar beets, carrots, onions and other row crops.

Other objects of the invention are to provide a gathering machine of the aforementioned character which will be comparatively simple in construction, strong, durable, highly efficient and reliable in operation, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top plan view of a two-row gathering machine constructed in accordance with the present invention.

Figure 2 is a view in vertical longitudinal section through the machine.

Figure 3 is a fragmentary cross sectional view, taken substantially on the line 3—3 of Figure 1.

Figure 4 is an elevational view of one of the spreaders.

Figure 5 is a detail view in vertical section, taken substantially on the line 5—5 of Figure 1.

Figure 6 is a detail view in perspective of one of the beet gripping jaws.

Referring now to the drawings in detail, it will be seen that the embodiment of the invention which has been illustrated comprises a horizontal frame 1 of suitable dimensions and material, said frame being substantially rectangular in plan. The frame 1 is provided, on its forward end, with suitable means 2 for connecting the machine to a tractor, wagon or other source of power.

Traversing the frame 1 at an intermediate point is an axle 3. A plurality of spaced disc wheels 4 are mounted on the axle 3 within the frame 1.

Tubular metallic couplings 5 on the axle 3 secure the wheels 4 together for rotation in unison. Toward this end, the couplings 5, in the embodiment shown, include apertured end flanges or heads 6 which are secured at 7 to the opposed sides of the wheels 4.

Radiating from the flanges 6 are pairs of opposed, resilient coacting arms 8 which terminate, at their free or outer ends, in toothed jaws 9. The pairs of resilient arms 8 normally converge toward their outer ends.

Mounted transversely in the frame 1, forwardly of the wheels 4, is a bar 10. Substantially V-shaped brackets 11 are secured, as at 12, on the bar 10 and project rearwardly between the wheels 4. Mounted vertically on the brackets 11 between the wheels 4 are arcuate spreaders 13 comprising rounded end portions 14. Suspended from the frame 1, forwardly of the bar 10, is a receptacle 15.

It is thought that the operation of the machine will be readily apparent from a consideration of the foregoing. Briefly, the machine is drawn over the ground, the supporting wheels 4 traveling on opposite sides of the rows of beets lying on said ground. The spreaders 13 hold the pairs of opposed, coacting gripping arms open until the jaws 9 are approximately at their lowermost position, at which point the beets on the ground are located therebetween. Thus, when the resilient arms 8 clear the spreaders 13, the opposed, toothed jaws 9 grip the beets and elevate them in a counter-clockwise direction. When the jaws, with the beets therebetween, reach substantially their uppermost position, the arms 8 again engage the spreaders 13 and are opened thereby. In this manner the beets are released and drop on the upper end portions of the spreaders 13 from which they roll by gravity down the upper legs of the substantially V-shaped brackets 11 into the receptacle 15. It will accordingly be seen that the brackets 11 constitute chutes for conveying the beets to the receptacle 15.

While a two-row implement has been shown, the machine may be built to gather any number of rows. Further, the machine may include suitable means for topping the beets, plowing said beets out of the ground and guiding or deflecting them between the wheels 4 for engagement by the elevating grippers.

It is believed that the many advantages of a gathering machine constructed in accordance with the present invention will be readily understood, and although a preferred embodiment of the implement is as illustrated and described, it is to be understood that changes in the details of construction and in the combination and arrangement of parts may be resorted to which will fall within the scope of the invention as claimed.

What is claimed is:

1. A gathering machine comprising a frame, an axle traversing said frame, spaced wheels mounted on said axle, tubular couplings on the axle connecting the wheels for rotation in unison, pairs of resilient arms on the ends of the couplings radiating therefrom between the wheels, opposed coacting jaws on the free ends of the arms adapted to engage and grip articles on the ground and elevate said articles, and means for spreading the arms for releasing the articles when they are in elevated position.

2. A gathering machine comprising a frame, an axle traversing said frame, spaced wheels mounted on said axle, tubular couplings on the axle connecting the wheels for rotation in unison, pairs of resilient arms on the ends of the couplings radiating therefrom between the wheels, opposed coacting jaws on the free ends of the arms adapted to engage and grip articles on the ground and elevate said articles, and means for spreading the arms for releasing the articles when they are in elevated position, said means including a transverse bar on the frame forwardly of the wheels, brackets on said bar extending between the wheels, and arcuate spreaders mounted vertically on the brackets between the wheels and in the paths of the arms.

3. A gathering machine comprising a frame, an axle traversing said frame, spaced wheels mounted on said axle, tubular couplings on the axle connecting the wheels for rotation in unison, said couplings including end flanges secured to the wheels, pairs of resilient, opposed arms projecting radially from the flanges between the wheels, coacting jaws on the free ends of the arms adapted to engage and grip articles on the ground and elevate said articles, and means on the frame for spreading the jaws for releasing the articles when they are in elevated position.

WILLIAM C. MORRIS.